United States Patent [19]
Nagel et al.

[11] Patent Number: 5,743,553
[45] Date of Patent: Apr. 28, 1998

[54] ACTIVE SUSPENSION SYSTEM

[75] Inventors: Guenter Nagel, Esslingen; Martin Winkler, Schwaikheim, both of Germany

[73] Assignee: Mercedes-Benz AG, Stuttgart, Germany

[21] Appl. No.: 427,047

[22] Filed: Apr. 24, 1995

[30] Foreign Application Priority Data

Apr. 22, 1994 [DE] Germany .................. 44 14 022.13

[51] Int. Cl.⁶ .................................................. B60G 11/26
[52] U.S. Cl. ................................................ 280/707; 280/709
[58] Field of Search ...................................... 280/702, 707, 280/709

[56] References Cited

U.S. PATENT DOCUMENTS

| | | |
|---|---|---|
| 3,606,233 | 9/1971 | Scharton . |
| 4,700,927 | 10/1987 | Young ........................ 280/707 |
| 5,056,812 | 10/1991 | Takehara et al. ............ 280/709 |

FOREIGN PATENT DOCUMENTS

| | | |
|---|---|---|
| 0 270 893 | 6/1955 | European Pat. Off. . |
| 0 315 163 | 5/1989 | European Pat. Off. . |
| 11 25 290 | 9/1966 | Germany . |
| 23 05 037 | 8/1974 | Germany . |
| 29 43 486 | 4/1981 | Germany . |
| 39 18 735 | 12/1990 | Germany . |
| 40 26 790 | 10/1991 | Germany . |
| 41 16 839 | 1/1992 | Germany . |
| 41 37 712 | 5/1992 | Germany . |
| 4-50013 | 2/1992 | Japan . |
| 4050007 | 2/1992 | Japan . |
| 4050013 | 2/1992 | Japan . |
| 2 067 141 | 7/1981 | United Kingdom . |
| 2 260 425 | 4/1993 | United Kingdom . |
| 2 271 746 | 4/1994 | United Kingdom . |
| WO 89/00512 | 1/1989 | WIPO . |
| WO 90/13447 | 11/1990 | WIPO . |

OTHER PUBLICATIONS

Japanese Abstract 59-213509, vol. 009, No. 084 (M-371), Apr. 13, 1985.
Japanese Abstract 02-081784, vol. 014, No. 276 (M-0984), Jun. 14, 1990.
Japanese Abstract 02-175312, vol. 014 No. 440 (M-1028), Sep.20, 1990.

*Primary Examiner*—Paul N. Dickson
*Attorney, Agent, or Firm*—Evenson, McKeown, Edwards & Lenahan, P.L.L.C.

[57] ABSTRACT

An active suspension system, in particular for motor vehicles, is provided whose suspension or support units arranged between the sprung and the unsprung mass have, in each case, a passive, uncontrolled spring element and, arranged in series with the latter, a hydraulic displacer unit with controllable adjustment. The arrangement of displacement pick-ups, which reproduce the stroke position of the sprung mass relative to the unsprung mass and the stroke of the displacer unit, allows for carrying out a regulation of the current supporting forces by a required/actual value comparison which uses only the displacement measurements.

9 Claims, 1 Drawing Sheet

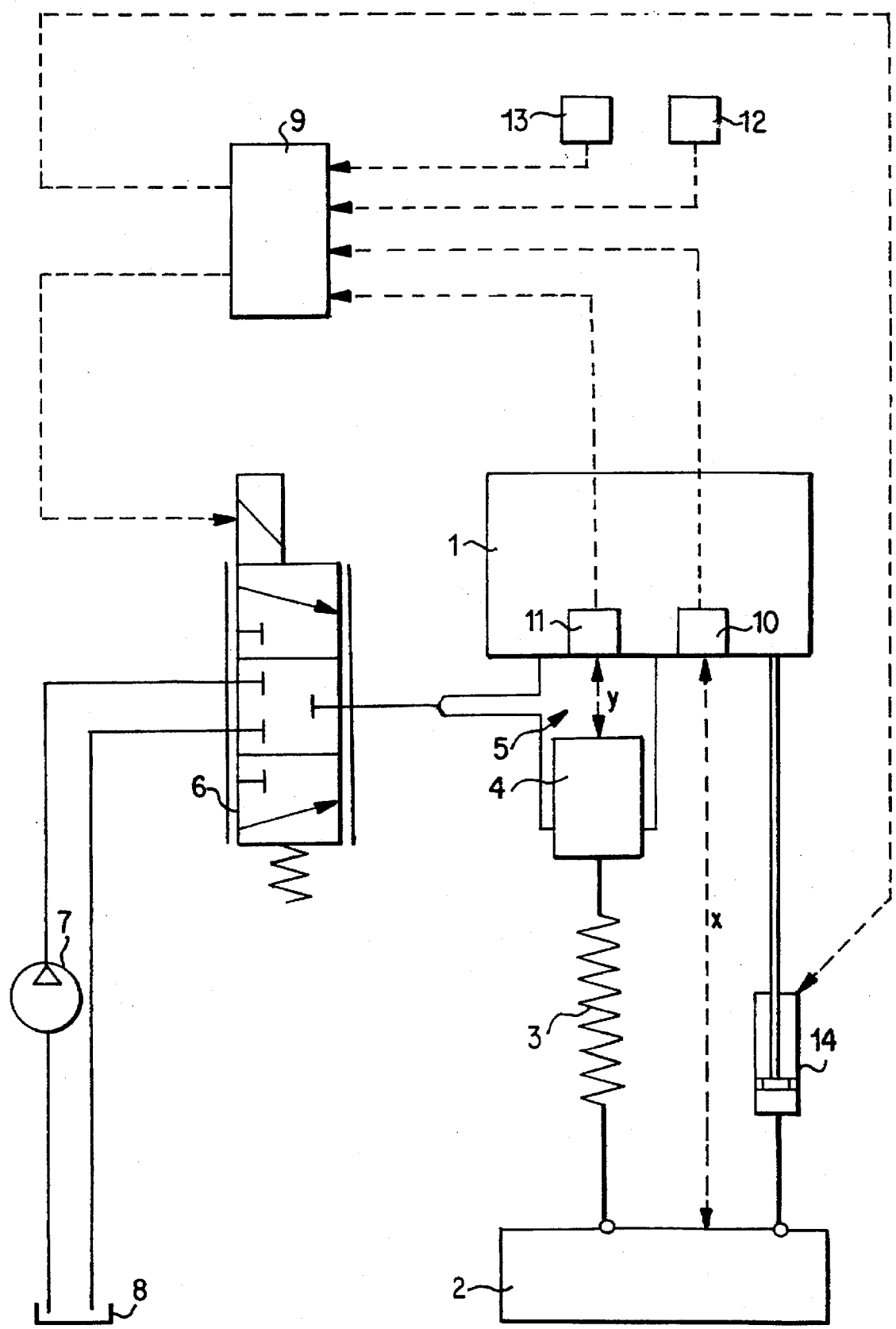

ACTIVE SUSPENSION SYSTEM

BACKGROUND SUMMARY OF THE INVENTION

The invention to an active suspension system, in particular for motor vehicles.

German Patent document 11 25 290, discloses the arrangement of a passive, uncontrolled spring element, specifically a helical spring; in series with a hydraulic displacer unit mounted on the chassis of the vehicle. The stroke of this displacer unit can be controlled to modify the ground clearance of the vehicle or to set a desired ground clearance. In this manner, therefore, it is possible to compensate for the deflection of the helical spring under the wheel load and, at the same time, it is possible to undertake settings of the vehicle level.

German Patent document 23 05 037 describes axle level regulation of a vehicle in which a passive, uncontrolled spring element is arranged in series with a controllable spring element which is intended to form the main spring and can, for example, be configured as a level-regulated pneumatic spring. On loading, the main spring maintains a practically unaltered position because of the regulation allocated to it, whereas the passive, uncontrolled spring element permits a certain deflection of the wheel because of the additional load. Overall, this arrangement can achieve the effect that the difference between the deflection displacements of an unregulated axle and a level-regulated axle is negligibly small when the vehicle is loaded.

German Patent document DE 29 43 486 C2, discloses an arrangement of a passive, uncontrolled spring element in series with a hydraulic displacer unit having a controllable adjustment. This displacer unit is essentially controlled through the use of accelerometers arranged at the superstructure end, in such a manner that compensation for the deflection of the sprung mass, i.e. the vehicle superstructure, is substantially provided by the setting stroke of the hydraulic displacer unit. The passive spring element mentioned above is relatively hard and permits only limited spring strokes. In any event, it is assumed in German Patent document DE 29 43 486 C2 that the vertical stroke of the superstructure approximately corresponds to the vertical stroke of the part of the hydraulic displacer unit connected to the superstructure via the passive, uncontrolled spring element, i.e. there should be a substantially "rigid" coupling.

German Patent document DE 40 26 790 C1 shows a computer-controlled suspension system in which hydraulic displacer units, whose stroke adjustment can be regulated, are arranged in series with passive, non-controllable spring elements. These displacer units can be connected to a pressure accumulator whose capacity is dimensioned for short-period activation so that they can deal with critical situations. It is intended, in particular, that the resonance excitation be prevented by this means. In order to be able to determine whether a critical condition is present, displacement pick-up transducers or similar sensors are arranged between the sprung mass or vehicle superstructure and the unsprung mass or wheel, and the frequency of vibrations occurring can also be determined from the signals of these sensors.

U.S. Pat. No. 3,606,233 also shows a suspension system in which a passive, uncontrolled spring element is arranged in series with an active element. The suspension system has a hydraulic displacer unit and has a stroke adjustment which can be regulated. In this arrangement, the stroke adjustment takes place as a function of the sprung mass acceleration, which is determined by means of an appropriate sensor. This determination is done in such a manner that decoupling with respect to vibration takes place between the sprung and the unsprung mass to the greatest possible extent.

German Patent document DE 39 18 735 A1 arranges a controllable shock absorber in a vehicle suspension system, in parallel with a passive, uncontrolled spring. This shock absorber is controlled from the evaluation of superstructure acceleration, which is determined by appropriate sensors, in such a manner that so-called "skyhook" shock absorption is produced.

In suspension systems, furthermore, it is fundamentally known in the art to determine the forces occurring in the force path between sprung and unsprung mass by means of force sensors which operate substantially without displacement in order to permit a control, which is also a function of force, of the active support or suspension units. Such systems are comparatively complicated. Furthermore, large phase shifts can appear between the forces in the force path and the relative motions between the sprung and unsprung mass.

There is therefore needed an active suspension system with easily realizable regulation, regulation as a function of force also being possible.

These needs are met according to the present invention by an active suspension system in which suspension or support units arranged between the sprung and the unsprung mass, have, in each case, a passive, uncontrolled spring element and, arranged in series with the latter, a hydraulic displacer unit with controllable stroke adjustment. Displacement pick-ups, which directly record both the respective stroke position of the unsprung mass relative to the sprung mass and the stroke of the respective displacer unit, are in each case associated with the suspension or support units. Actual values of the respective supporting forces effective between the sprung mass and the unsprung mass are determined from the spring condition, which can be recorded by means of the displacement pick-up signals of the passive, uncontrolled spring element. The regulation of the adjustment of the displacer unit takes place as a function of required values, which have to be specified, of the supporting forces and of a parameter characteristic of the state of motion of the sprung mass.

The present invention creates an advantageous suspension system for vehicles which has safe emergency operating properties because of the passive spring elements. Because the forces effective in the force path between the wheel and the superstructure are recorded indirectly by displacement measurements, only signals of similar type and phase; namely signals from displacement pick-ups, need to be evaluated in order to determine the spring force and the influence of the suspension on the vehicle position and its change with respect to time.

In order to determine whether a suspension operating condition should be attributed to an instantaneously effective roadway irregularity or a vibration motion as a consequence of an earlier roadway irregularity, a characteristic parameter of the motion of the vehicle superstructure, for example the vertical superstructure acceleration, is additionally employed.

The present invention is based on the concept of completely dispensing with the direct recording of the supporting forces, or of the pressures effective in fluid units, and the concept of determining the supporting forces effective between the sprung and unsprung mass exclusively by measuring displacement or by recording stroke positions for an active suspension system.

The present invention makes use of the fact that in the suspension system according to the invention, the respective supporting forces effective at a suspension or support unit are specified, on the one hand, by the spring characteristic of the passive uncontrolled spring element as specified in the design and, on the other hand, by the difference (x–y) between the stroke position (x) of the unsprung mass relative to the sprung mass and the stroke (y) of the respective displacer unit. This is because this difference unambiguously and reversibly reproduces the spring condition of the passive, uncontrolled spring element, i.e., the magnitude of the spring load.

The present invention offers the advantage of a particularly simple regulation technique because it is particularly simple to carry out displacement measurements or the measurements of parameters which are analogous to the displacement. The other design requirements are also relatively small. In general, it is only necessary to have a sufficiently powerful pressure source and control valves for the supply and drainage of the hydraulic medium to and from the displacer unit. An advantage, in this respect, is that relatively little power is required to hold the displacer unit in a desired position; for this purpose it is generally sufficient to use shut off valves.

It is also advantageous that friction in the displacer units does not involve any sacrifice in comfort when the vehicle is simply rolling. This is because the passive, uncontrolled spring element always remains effective. Furthermore, it is possible to compensate for the friction in the position regulation of the displacer units.

If faults should occur in the suspension system computer, emergency operation can readily be carried out because the displacer units are either automatically or under manual control brought into a specified position and can be brought to rest in this position or locked hydraulically by shutting off the valves. The suspension system therefore operates like a purely passive conventional system.

Other objects, advantages and novel features of the present invention will become apparent from the following detailed description of the invention when considered in conjunction with the accompanying drawings.

BRIEF DESCRIPTION OF THE DRAWING

The single FIGURE is a schematic diagram of a suspension and support unit, in accordance with the present invention, arranged between a wheel and a vehicle superstructure.

DETAILED DESCRIPTION OF THE DRAWING

Referring to the figure, a passive, uncontrolled spring element 3, in the form, for example, of a steel helical compression spring, is arranged in a fundamentally known manner between the superstructure 1 of a motor vehicle, which forms the sprung mass, and a wheel 2, which forms an unsprung mass. The abutment of the spring element 3 at the superstructure end is configured as a plunger 4 of a hydraulic displacer unit 5 arranged on the superstructure 1. This displacer unit 5 can be steplessly connected by means of a control valve 6 to a hydraulic pressure source 7 and to an essentially unpressurized reservoir 8, or it can be shut off from the pressure source 7 and the reservoir 8.

The control valve 6 is controlled by an open-chain or closed-loop electronic control system 9. The control system 9 is connected at the input end to sensors 10 and 11 for the stroke position x of the wheel 2 relative to the superstructure It and for the stroke position y of the plunger 4 relative to the superstructure 1.

In addition, the open-chain or closed-loop electronic control system 9 can be connected, at its input end, to further sensors 12, which are used for monitoring further parameters, for example the vehicle superstructure acceleration, wheel acceleration, steering wheel angle, yaw rate, speed, etc. The further sensors 12 can permit the suspension and damping rates of the superstructure, the intrinsic steering behavior of the vehicle and/or a setting of the superstructure position (superstructure levelling) to be influenced.

In addition, arbitrarily actuable switches 13, by means of which various open-chain or closed-loop tuning systems can be switched on, can be arranged at the input end of the open-chain or closed-loop electronic control system 9.

A conventional or, preferably, switchable shock absorber 14 is arranged in parallel with the spring element 3. The shock absorber 14 operates between the superstructure 1 and the wheel 2 or the wheel-end abutment of the spring element 3.

The shock absorber 14 is preferably tuned in such a manner that it is particularly effective for damping the so-called wheel resonance, i.e. if the wheels 2 attempt to "trample".

The arrangement represented essentially operates in the following manner. From the signals of the sensors 10, which reproduce the stroke positions x of the wheels 2 relative to the superstructure 1, the open-chain or closed-loop electronic control system 9 determines a required supporting force value which has to be effective between the superstructure 1 and the respective wheel 2 - taking into account, if appropriate, the signals of the further sensors 12. Instead of this, a parameter analogous to the supporting force can also be specified. The following relationship applies to the required value $A_{required}$ of the supporting force:

$$A_{required} = k \, (x-y)_{required};$$

where k is the coefficient of elasticity of the spring element 3. The simplicity with which $A_{required}$ can be calculated is based on the fact that the value of the supporting force is essentially determined by the load on the spring element 3. This spring load changes in a manner analogous to the difference x–y.

In a corresponding manner, the actual value $A_{actual}$ of the respective supporting force effective between the superstructure 1 and the wheel 2 can be determined from the signals of the sensors 10 and 11:

$$A_{actual} = k \, (x-y)_{actual}.$$

The regulation of the supporting forces, which is possible in the invention by required/actual value comparison, can therefore take place by required/actual value comparison of the displacement distances $(x-y)_{required}$ and $(x-y)_{actual}$.

In order to carry out the desired regulation, it is only necessary to ensure that the plunger 4 of the displacer unit 5 can be adjusted relatively rapidly by comparison with the possible relative speeds between the superstructure 1 and the wheels 2. For this purpose, the pressure source 7 must have a corresponding power and, in addition, the control valve 6 must be able to control correspondingly large cross-sections.

If the open-chain or closed-loop electronic control system 9 should fail or operate incorrectly, emergency operation is readily possible in which the plunger 4 is locked hydraulically in a specified position in the displacer unit 5 and, if the shock absorber 14 is switchable, it is switched to hard damping.

The selection of the emergency operation can take place automatically when a fault occurs in the open-chain or closed-loop electronic control system. Alternatively, it is also possible for the driver to actuate corresponding control units in order to select the emergency operation.

The signals of the sensors 10, which reproduce the stroke positions x of the wheels 2, are preferably filtered for calculating the actual value of the supporting force of the spring element 3 so that, in this connection, rapid wheel motions are not factored into account. This is because the motions of the superstructure 1 which have to be influenced by adjustment of the plunger 4 are mainly those which are relatively slow.

At the same time, the signals of the sensors 10 should also be able to reproduce rapid wheel motions so that the open-chain or closed-loop electronic control system 9 has the possibility of switching on the shock absorber 14 to dampen wheel resonance in the case of wheel motions in the vicinity of the wheel resonant frequency.

In the present invention, it is essentially only the relatively slow motions of the vehicle superstructure which are influenced by the regulation of the supporting forces. The relatively rapid wheel motions, in particular those in the wheel resonance range, are influenced (damped) almost exclusively by the shock absorber 14. Because the superstructure motions have a typical frequency of between 1 and 2 Hz whereas the frequency of the wheel resonance is some 15 to 20 Hz, the supporting force control system used for influencing the superstructure motions can therefore operate relatively slowly.

It is also useful to arrange a pressure accumulator (not shown) between the pump 7 and the control valve 6.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An active suspension system for motor vehicles, comprising:
   a suspension unit arranged between a sprung mass and an unsprung mass, said suspension unit having a passive, uncontrolled spring element and, arranged in series with said spring element, a hydraulic displacer unit having a controllable stroke adjustment;
   displacement sensors associated with the suspension unit, said displacement sensors generating both a first signal representing a respective stroke position (x) of the unsprung mass relative to the sprung mass, and a second signal representing a respective stroke position (y) of the displacer unit;
   a further sensor generating a third signal representing a vertical acceleration of the sprung mass;
   a regulation system generating a fourth signal, $(x-y)_{actual}$, representing a difference between the first and second signals, said difference representing a suspension force of the uncontrolled spring element, and controlling the stroke adjustment of the displacer unit in accordance with a comparison of said fourth signal with a required value, $(x-y)_{required}$, and the third signal for only dampening vertical motions of the sprung mass.

2. A system according to claim 1, further comprising:
   a controllable shockabsorber arranged in parallel with the uncontrolled spring element, said shockabsorber dampening resonance motions of the unsprung mass relative to the sprung mass.

3. A system according to claim 2, wherein the shockabsorber is arranged in parallel with the series arrangement of the uncontrolled spring element and the hydraulic displacer unit.

4. A system according to claim 1, wherein the sprung mass is a vehicle superstructure and the unsprung mass is a vehicle wheel.

5. A system according to claim 2, wherein the sprung mass is a vehicle superstructure and the unsprung mass is a vehicle wheel.

6. A system according to claim 3, wherein the sprung mass is a vehicle superstructure and the unsprung mass is a vehicle wheel.

7. A system according to claim 4, further comprising:
   an additional sensor which generates a further signal representing at least one of the following additional parameters: wheel acceleration, steering angle, yaw rate and speed of the vehicle, said further signal modulating said regulation system.

8. A system according to claim 5, further comprising:
   an additional sensor which generates a further signal representing at least one of the following additional parameters: wheel acceleration, steering angle, yaw rate and speed of the vehicle, said further signal modulating said regulation system.

9. A system according to claim 6, further comprising:
   an additional sensor which generates a further signal representing at least one of the following additional parameters: wheel acceleration, steering angle, yaw rate and speed of the vehicle, said further signal modulating said regulation system.

* * * * *